J. L. PETERSON.
CLUTCH.
APPLICATION FILED FEB. 16, 1921.
1,430,468.
Patented Sept. 26, 1922.
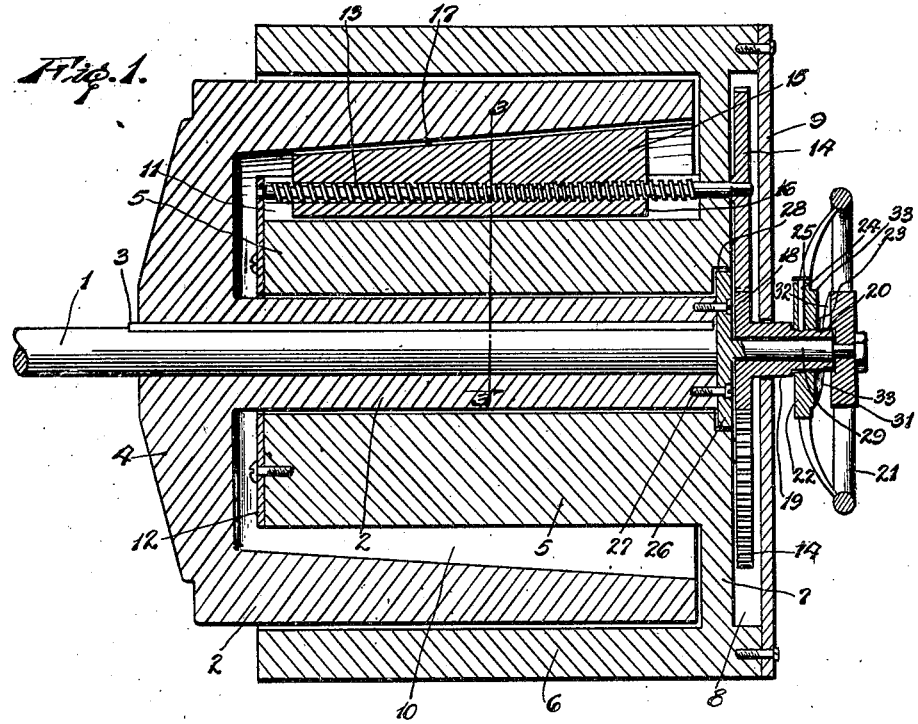
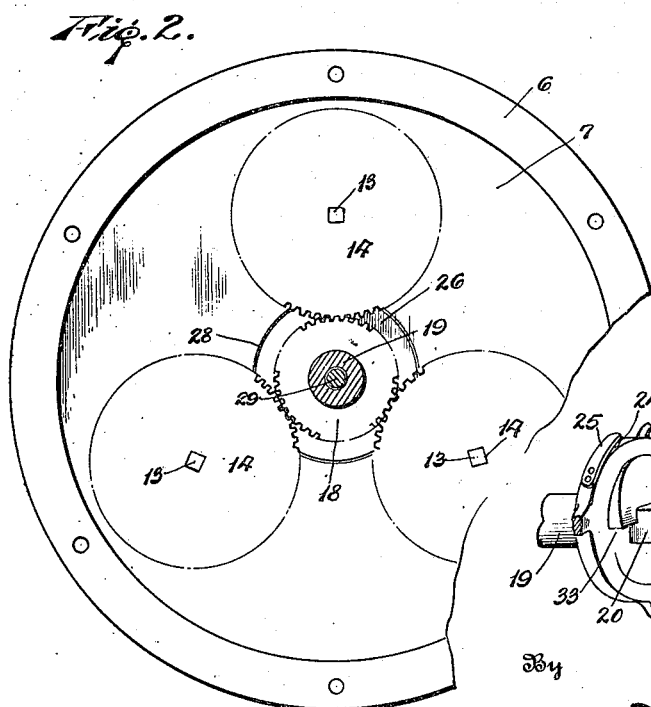
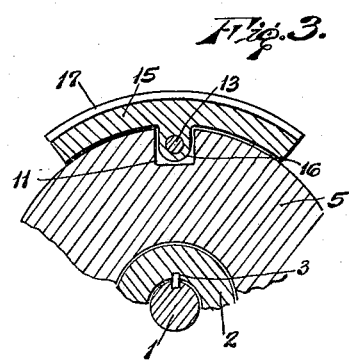
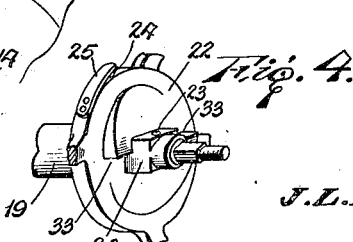
Inventor
J. L. Peterson.
By
Lacey & Lacey, Attorneys Patented Sept. 26, 1922.

1,430,468

UNITED STATES PATENT OFFICE.

JOSEPH L. PETERSON, OF WELLSBURG, WEST VIRGINIA.

CLUTCH.

Application filed February 16, 1921. Serial No. 445,342.

*To all whom it may concern:*

Be it known that I, JOSEPH L. PETERSON, a citizen of the United States, residing at Wellsburg, in the county of Brooke and State of West Virginia, have invented certain new and useful Improvements in Clutches, of which the following is a specification.

This invention seeks to provide simple, inexpensive and easily operated means whereby a loose pulley may be effectually coupled to a driving shaft when work is to be done or may be readily released therefrom to permit the driving shaft to run idle. The invention seeks to provide means for the stated purpose which will be compactly arranged and effectually protected against the collection of dust and dirt which would tend to clog the operation.

The invention is illustrated in the accompanying drawings and consists in certain novel features which will be particularly pointed out in the claims following a detailed description.

In the drawings—

Figure 1 is a longitudinal section showing my improved clutch in operative relation to a driving shaft and a pulley;

Fig. 2 is an end elevation of the same, the cover plate being removed;

Fig. 3 is a detail transverse section on the line 3—3 of Fig. 1;

Fig. 4 is a detail perspective of a portion of the controlling hand wheel.

In the drawings, the reference numeral 1 indicates an engine shaft having a clutch sleeve 2 connected therewith by any suitable means such as a key 3 engaging the shaft and the closed head 4 of the sleeve. The open end of the sleeve is disposed at the free end of the shaft and around the sleeve is the hub 5 of the pulley 6 which fits loosely about the shaft, the peripheral member of the pulley being connected to the hub by a web or disk 7, as shown and as will be readily understood. The said web or disk 7 is spaced inwardly from the adjacent end of the pulley so as to provide a circular recess 8 which receives the gearing by which the clutch shoes are manipulated and a cap plate 9 is secured to the adjacent end of the pulley so as to extend over said recess and prevent the entrance of dirt and dust thereto. It will be understood, of course, that one end of the pulley hub is open and receives the clutch sleeve 2, as clearly shown in Fig. 1. The inner circular wall 10 of the clutch sleeve is flared from the head 4 to the open end of the sleeve and in the hub member 5 of the pulley are longitudinal grooves 11 which are spaced equi-distantly around the hub. A bearing plate 12 is secured to the inner end of the hub and threaded rods or worms 13 are rotatably mounted at their opposite ends in the said plate 12 and in the web 7 of the pulley, the outer ends of said rods or worms being extended into the recess 8 and provided with flat sides or otherwise formed so as to receive and hold gears 14. Clutch shoes 15 are disposed at intervals about the hub 5 and each shoe is provided on its inner face with a longitudinal centrally disposed internally threaded sleeve 16 which receives and is engaged by the corresponding threaded rod or worm 13. The outer surface of each shoe is inclined with respect to the rod or worm 13, as shown at 17, and the inclination of this face is approximately the same as the inclination of the flared wall of the clutch sleeve. It will, therefore, be readily understood that if the rod 13 be rotated the sleeve 16, acting as a nut upon the rod and being held against rotation by the walls of the groove 11, will cause the shoe to move longitudinally of the said groove and the inclined face 17 of the shoe will be thereby caused to effect binding engagement with the flared wall of the clutch sleeve or be released therefrom so that, in the former instance, the pulley will be caused to rotate with the sleeve, or in the latter instance, the sleeve may rotate freely without imparting motion to the pulley.

The gears 14 carried by the respective rods 13 are all in mesh with a master pinion 18 which is in axial alinement with the driving shaft 1 and has an extended hub 19 projecting through the cap plate 9 and having an angular outer extremity 20. A hand wheel 21 has its hub 22 fitted slidably upon the angular extremity of the hub or hollow shaft 19 and in one face of said angular extremity are sockets 23 to be engaged by a latch pin 24 mounted radially in the hub 22 and pressed inwardly as by a leaf spring 25 secured upon the hub. A retaining disk or plate 26 is secured to the end of the sleeve 2 by cap screws 27 or the like and fits within a circular recess 28 in the outer face of the web 7 so that the pulley is prevented from having movement longitudinally of the driving shaft. A spindle 29 extends centrally from the retaining disk in axial alinement with the driving shaft and supports the hollow shaft 19. The spindle projects beyond the end of the shaft or hub 19 and its extremity is of angular formation to non-rotatably receive a clutch or ratchet disk 31 provided on its face with clutch shoulders or ratchets 32 adapted to engage similar mating members 33 on the outer face of the hub 22 of the hand wheel. It will be readily noted that the master pinion 18 causes the several gears 14 to simultaneously rotate in the same direction so that the several clutch shoes carried by the respective rods 13 will be caused to move simultaneously into or out of binding engagement with the clutch sleeve and the pulley will be thereby quickly connected to or released from the driving shaft. Assuming the driving shaft to be in motion, the spindle 29 and clutch disk 31 will also be rotating. If the hand wheel be drawn outwardly, the clutch members 33 will be brought into engagement with the clutch shoulders or ratchets 32 so that the shaft 19 will be locked to the spindle and rotation will be consequently imparted to the master pinion 18 and the clutch shoes moved into engagement with the pulley. If the hand wheel be pushed inwardly and held, the rotation of the pulley with the clutch sleeve will effect reverse rotation of the gears 14 and the clutch shoes will be released.

My device is exceedingly simple in the construction and arrangement of its parts and in actual practice is found to be highly efficient for the purpose for which it is designed.

Having thus described the invention, what is claimed as new is:

1. The combination of a driving shaft, a clutch sleeve carried by said shaft and having an open end, a pulley fitted loosely about the shaft and having a hub member fitted within the sleeve, threaded rods arranged longitudinally of said hub member, clutch shoes mounted directly upon and engaged by said threaded rods and movable thereby longitudinally of the hub to bind against or be released from the clutch sleeve, and means carried by the pulley for rotating said threaded rods.

2. The combination of a driving shaft, an open-ended clutch sleeve carried by said shaft, a pulley fitted loosely about the shaft and having a hub member fitting within said sleeve, said hub member being constructed with longitudinal grooves, threaded rods disposed longitudinally of said grooves, clutch shoes mounted upon the hub and having sleeves fitted within the grooves in the hub and receiving and engaged by the threaded rods, and means carried by the pulley for rotating said rods.

3. The combination of a driving shaft, a clutch sleeve carried by said shaft, a pulley having a hub member fitting within the sleeve, clutch shoes mounted upon the hub to engage the sleeve, threaded rods mounted longitudinally on the hub member of the pulley and passing through and engaging said shoes, a spindle extending axially from the driving shaft, a hollow shaft through which the spindle passes, a master pinion fixed to the hollow shaft, gears on the ends of the threaded rods meshing with the master pinion, a relatively fixed ratchet disk on the spindle, a mating ratchet disk slidable on the hollow shaft, means for shifting the ratchet disk on the hollow shaft into or out of engagement with the ratchet disk on the spindle, and means for holding the ratchet disk on the hollow shaft in a set position.

In testimony whereof I affix my signature.

JOSEPH L. PETERSON. [L. S.]